(12) United States Patent
Kim et al.

(10) Patent No.: US 12,607,738 B2
(45) Date of Patent: Apr. 21, 2026

(54) METHOD AND DEVICE WITH OBJECT RECOGNITION FOR INFORMATION COLLECTED FROM MOVING OBJECT

(71) Applicant: SAMSUNG ELECTRONICS CO., LTD., Suwon-si (KR)

(72) Inventors: Jong-Sok Kim, Suwon-si (KR); Sungdo Choi, Suwon-si (KR); Seung Tae Khang, Suwon-si (KR); Jinyong Jeon, Suwon-si (KR); Young Rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 18/183,881

(22) Filed: Mar. 14, 2023

(65) Prior Publication Data

US 2024/0125923 A1    Apr. 18, 2024

(30) Foreign Application Priority Data

Oct. 12, 2022    (KR) ........................ 10-2022-0130450

(51) Int. Cl.
*G01S 13/42* (2006.01)
*B60W 40/02* (2006.01)
(Continued)

(52) U.S. Cl.
CPC ............ *G01S 13/931* (2013.01); *G06V 10/82* (2022.01); *G06V 20/58* (2022.01)

(58) Field of Classification Search
CPC ........ G01S 13/931; G01S 13/42; G01S 17/42; G01S 17/86; G01S 7/2955; G01S 7/417;
(Continued)

(56) References Cited

U.S. PATENT DOCUMENTS

| | | | |
|---|---|---|---|
| 6,246,365 B1 | 6/2001 | Tokoro | |
| 6,573,859 B2 | 6/2003 | Tokoro | |

(Continued)

FOREIGN PATENT DOCUMENTS

| | | | |
|---|---|---|---|
| EP | 3 832 341 A1 | 6/2021 | |
| JP | 2021-082294 A | 5/2021 | |

(Continued)

OTHER PUBLICATIONS

Asano, Shinka, et al, "Rule-Based Cooperative Lane Change Control to Avoid a Sudden Obstacle in a Multi-Lane Road." 2022 IEEE 95th Vehicular Technology Conference:(VTC2022—Spring). IEEE, 2022., (7 pages).

(Continued)

*Primary Examiner* — Chineyere Wills-Burns
*Assistant Examiner* — Lucius Cameron Gree Allen
(74) *Attorney, Agent, or Firm* — NSIP Law

(57) ABSTRACT

A method and device for object recognition for information collected from a sensor of a moving object are disclosed. The method may include identifying a target with a confidence level of recognition accuracy less than a threshold, based on first sensing information collected from a moving object, obtaining second sensing information on the target from an interworking moving object, synchronizing the first sensing information and the second sensing information based on time information included in the first sensing information and time information included in the second sensing information, and training a neural network for estimating recognition information of the target from the first synchronized sensing information by using information on the target included in the second synchronized sensing information as ground truth data.

19 Claims, 6 Drawing Sheets

(51) Int. Cl.

| | |
|---|---|
| *B60W 40/10* | (2012.01) |
| *B60W 50/00* | (2006.01) |
| *G01S 7/295* | (2006.01) |
| *G01S 7/41* | (2006.01) |
| *G01S 13/46* | (2006.01) |
| *G01S 13/86* | (2006.01) |
| *G01S 13/87* | (2006.01) |
| *G01S 13/931* | (2020.01) |
| *G01S 17/42* | (2006.01) |
| *G01S 17/46* | (2006.01) |
| *G01S 17/86* | (2020.01) |
| *G01S 17/931* | (2020.01) |
| *G06F 18/214* | (2023.01) |
| *G06N 3/0464* | (2023.01) |
| *G06N 3/08* | (2023.01) |
| *G06V 10/82* | (2022.01) |
| *G06V 20/58* | (2022.01) |
| *H04W 4/46* | (2018.01) |

(58) Field of Classification Search
CPC .......... G01S 13/46; G01S 13/87; G01S 17/46; G01S 17/931; G01S 13/865; G01S 2013/9316; G06V 10/82; G06V 20/58; H04W 4/46; G06F 18/214; G06N 3/0464; G06N 3/08; B60W 40/02; B60W 40/10; B60W 2050/0005; B60W 2420/408; B60W 2554/20; B60W 2554/40; B60W 2556/65
USPC ........................................................ 382/103
See application file for complete search history.

(56) References Cited

U.S. PATENT DOCUMENTS

| | | | |
|---|---|---|---|
| 6,693,583 | B2 | 2/2004 | Tamatsu et al. |
| 7,499,638 | B2 | 3/2009 | Arai et al. |
| 7,650,239 | B2 | 1/2010 | Samukawa et al. |
| 8,841,994 | B2 | 9/2014 | Li et al. |
| 8,952,628 | B1 | 2/2015 | Gordin et al. |
| 9,201,421 | B1 * | 12/2015 | Fairfield .............. G05D 1/0088 |
| 9,623,869 | B2 | 4/2017 | Matsuno |
| 10,061,017 | B2 | 8/2018 | Hibino |
| 10,074,026 | B2 | 9/2018 | Sun et al. |
| 10,404,261 | B1 | 9/2019 | Josefsberg et al. |
| 10,576,972 | B2 | 3/2020 | Gokan et al. |
| 10,997,461 | B2 * | 5/2021 | Elluswamy .......... G06V 20/588 |
| 11,158,076 | B2 | 10/2021 | Tsunashima |
| 2017/0101056 | A1 * | 4/2017 | Park ...................... G08G 1/162 |
| 2017/0178498 | A1 * | 6/2017 | Mcerlean .............. B60K 35/10 |
| 2017/0341647 | A1 * | 11/2017 | Rajvanshi ....... B60W 60/00274 |
| 2018/0203130 | A1 * | 7/2018 | Neubecker .............. G01S 19/46 |
| 2019/0005386 | A1 * | 1/2019 | Chen .................... G06N 3/0464 |
| 2019/0294896 | A1 * | 9/2019 | Jia ............................ G06N 3/00 |
| 2019/0294966 | A1 * | 9/2019 | Khan ................... G06N 3/0464 |
| 2019/0375425 | A1 | 12/2019 | Harrison |
| 2019/0391235 | A1 * | 12/2019 | Harrison ................ G01S 7/003 |
| 2020/0209867 | A1 | 7/2020 | Valois et al. |
| 2020/0210715 | A1 | 7/2020 | Golomedov et al. |
| 2020/0219264 | A1 | 7/2020 | Brunner et al. |
| 2021/0263157 | A1 * | 8/2021 | Zhu ...................... G06V 10/774 |
| 2022/0163974 | A1 * | 5/2022 | Davis .................... G05D 1/628 |
| 2022/0324468 | A1 | 10/2022 | Ishikawa |

FOREIGN PATENT DOCUMENTS

| | | |
|---|---|---|
| KR | 10-2018-0055292 A | 5/2018 |
| KR | 10-2021-0037955 A | 4/2021 |
| WO | WO 2021/049233 A1 | 3/2021 |

OTHER PUBLICATIONS

Partial European search report issued on Mar. 11, 2024, in counterpart European Patent Application No. 23172703.3 (40 pages).

* cited by examiner

METHOD AND DEVICE WITH OBJECT RECOGNITION FOR INFORMATION COLLECTED FROM MOVING OBJECT

CROSS-REFERENCE TO RELATED APPLICATIONS

This application claims the benefit under 35 USC § 119(a) of Korean Patent Application No. 10-2022-0130450, filed on Oct. 12, 2022, in the Korean Intellectual Property Office, the entire disclosure of which is incorporated herein by reference for all purposes.

BACKGROUND

1. Field

The following description relates to a method and device for processing information collected from a sensor of a moving object.

2. Description of Related Art

A driver-less car or self-driving car is a car that may drive on its own without receiving input from a driver. The driver-less vehicle may drive autonomously by recognizing a surrounding environment using sensors such as a radar sensor, a lidar (light detection and ranging) sensor, GPS, a camera, and the like. The lidar sensor may emit a high-output laser pulse and measure time it takes for the high-output laser pulse r to be reflected by a surrounding object to be returned. Accordingly, a distance and shape of the object may be determined. The lidar sensor may precisely recognize an object three-dimensionally by measuring information on a width and height, in addition to the range from the object, but it is sensitive to the influence of an external environment. The radar sensor differs from the lidar sensor in that it uses radio waves instead of lasers. The radar sensor may emit a radio wave and obtain information on a range, velocity, and direction of an object with data of the radio wave which is reflected by an object and returned. However, the radar sensor may not be very accurate in recognizing the shape of an object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided processor-implemented method, the method including identifying a target with a confidence level of recognition accuracy less than a threshold, based on first sensing information collected from a moving object, obtaining second sensing information on the target from an interworking moving object, synchronizing the first sensing information and the second sensing information based on time information included in the first sensing information and time information included in the second sensing information, and training a neural network for estimating recognition information of the target from the first synchronized sensing information by using information on the target included in the second synchronized sensing information as ground truth data.

The confidence level of the second sensing information may be greater than or equal to the threshold.

The method may include calculating a relative positional relationship between the moving object and the interworking moving object based on the first sensing information and the second sensing information, and extracting information on the target from the second sensing information based on the relative positional relationship between the moving object and the interworking moving object.

The second sensing information may include position information of at least one surrounding object detected by the interworking moving object, and the extracting of the information on the target from the second sensing information may include converting position information of the at least one surrounding object with respect to a position of the moving object based on the relative positional relationship between the moving object and the interworking moving object, and identifying the target from the at least one surrounding object based on the converted position information of the surrounding object.

The method may include obtaining the information on the target by applying the first sensing information to the neural network, in response to estimation performance of the neural network satisfying a threshold.

The method may include correcting the information on the target included in the first sensing information based on the information on the target included in the second sensing information.

The first sensing information may include information on the target detected by a first sensor of the moving object, and the second sensing information may include information on the target detected by a second sensor of the interworking moving object.

The first sensor may include a radar sensor.

The second sensor may include a lidar sensor.

The first sensing information may include position information of the moving object and relative position information of the target with respect to the moving object.

The second sensing information may include position information of the interworking moving object, relative position information of the target based on the interworking moving object, and recognition information of the target.

The information on the target may include any one or more of classification information, segmentation information, or position information of the target.

In another general aspect, there is provided a method including at least one processor configured to identify a target with a confidence level of recognition accuracy less than a threshold, based on first sensing information collected from the moving object, obtain second sensing information on the target from an interworking moving object, synchronize the first sensing information and the second sensing information based on time information included in the first sensing information and time information included in the second sensing information, and training a neural network for estimating recognition information of the target from the first synchronized sensing information by using information on the target included in the second synchronized sensing information as ground truth data.

The moving object may include at least one sensor configured to collect information on an object around the moving object.

The moving object may include a communication module configured to exchange data with the interworking moving object.

The processor may be configured to calculate a relative positional relationship between the moving object and the interworking moving object based on the first sensing information and the second sensing information, and extract information on the target from the second sensing information based on the relative positional relationship between the moving object and the interworking moving object.

The second sensing information may include position information of at least one surrounding object detected by the interworking moving object, and the processor may be configured to convert position information of the at least one surrounding object with respect to a position of the moving object based on the relative positional relationship between the moving object and the interworking moving object, and identify the target from the at least one surrounding object based on the converted position information of the surrounding object.

The processor may be configured to obtain the information on the target by applying the first sensing information to the neural network, in response to estimation performance of the neural network satisfying a threshold.

The processor may be configured to correct the information on the target included in the first sensing information based on the information on the target included in the second sensing information.

The first sensing information may include information on the target detected by a first sensor of the moving object, and the second sensing information may include information on the target detected by a second sensor of the interworking moving object.

The first sensor may include a radar sensor.

The second sensor may include a lidar sensor.

In another general aspect, there is provided a processor-implemented method, the method including identifying a target with a confidence level of recognition accuracy less than a threshold, based on first sensing information collected from a moving object, obtaining second sensing information on the target from an interworking moving object, synchronizing the first sensing information and the second sensing information based on time information included in the first sensing information and time information included in the second sensing information, inputting the first synchronized sensing information to a neural network to obtain an output, and training the neural network to minimize the difference between the output and the second synchronized sensing information.

The method may include obtaining information on the target by applying the first sensing information to the neural network, in response to estimation performance of the neural network satisfying a threshold.

The method may include obtaining information on the target by applying the first sensing information to the neural network, in response to the difference being lesser than a threshold.

Other features and aspects will be apparent from the following detailed description, the drawings, and the claims.

Figure 1:
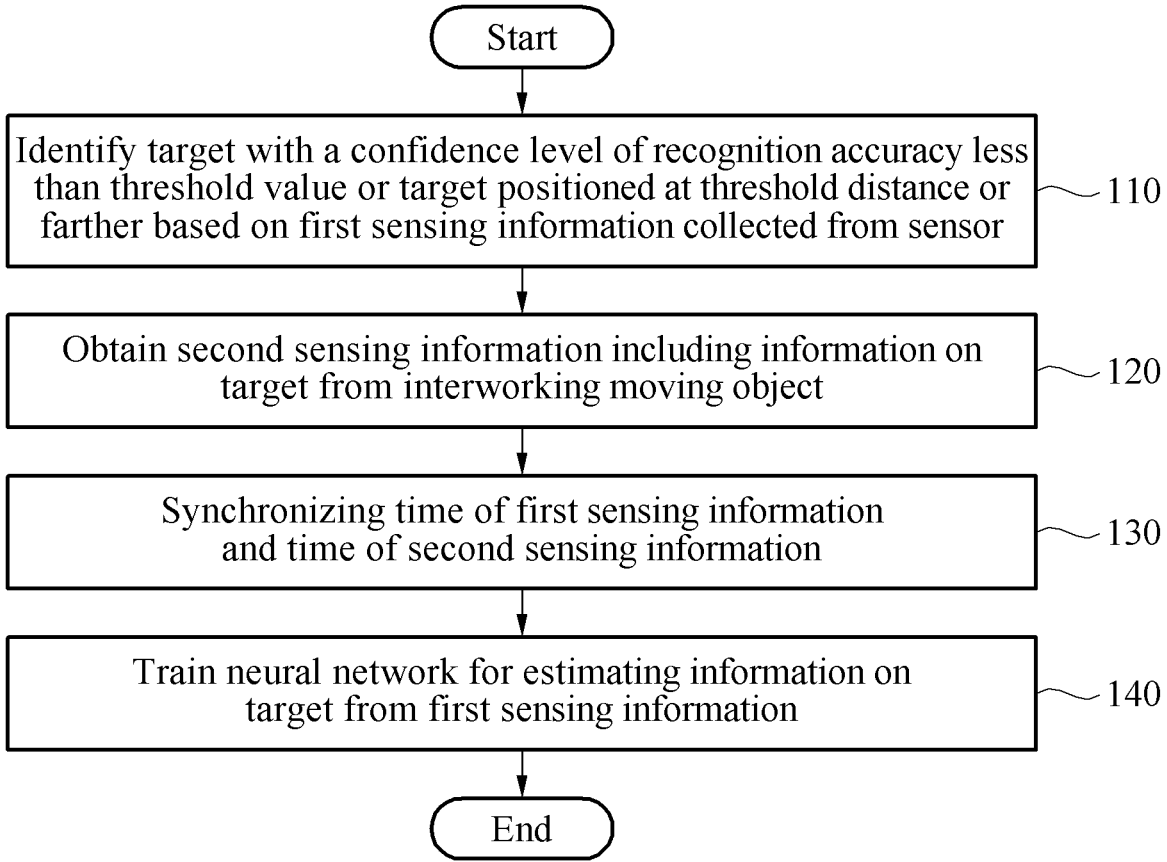
FIG. 1 illustrates an example of a method of processing information collected from a sensor of a moving object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The singular forms "a," "an," and "the" are intended to refer to the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto.

Hereinafter, the examples will be described in detail with reference to the accompanying drawings. When describing the examples with reference to the accompanying drawings, like reference numerals refer to like elements and any repeated description related thereto will be omitted.

FIG. 1 illustrates an example of a method of processing information collected from a sensor of a moving object. The operations of FIG. 1 may be performed in the sequence and manner as shown. However, the order of some operations may be changed, or some of the operations may be omitted, without departing from the spirit and scope of the shown example. Additionally, operations illustrated in FIG. 1 may be performed in parallel or simultaneously. One or more blocks of FIG. 1, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., device 600 in FIG. 6).

Referring to FIG. 1, a method of processing information collected from a sensor of a moving object (hereinafter, referred to as information processing method) may include operation 110 of identifying a target with a confidence level of recognition accuracy less than a threshold value or a target positioned at a distance based on first sensing information collected from the sensor. In some examples, the distance may be greater than or equal to a threshold.

The first sensing information according to an example may include information obtained from the sensor of the moving object and/or information obtained by processing the information obtained from the sensor of the moving object. For example, the sensor of the moving object may include at least one of a position sensor (e.g., a Global Positioning System (GPS) sensor), a velocity sensor, an inertial measurement unit (IMU), a camera (e.g., infrared (IR), mono, dual color, red, green blue, and white (RGBW), active, and passive cameras), a lidar (light detection and ranging) sensor, a radar (radio detection and ranging) sensor, or a fusion sensor. For example, the first sensing information may include position information of the moving object. The position information of the moving object may include one or more of a position value of the moving object, a value of a change in position of the moving object, or a velocity of the moving object. For example, the position information of the moving object may include absolute velocity information and international global navigation satellite system (GNSS) service (IGS) information of the moving object. For example, the absolute velocity information of the moving object may include absolute velocity information measured by a velocity measuring sensor of the moving object. For example, the absolute velocity information of the moving object may include absolute velocity information determined by an velocity estimation algorithm.

The first sensing information according to an example may include information on an object detected by the sensor of the moving object. The object detected by the sensor of the moving object may include at least one object positioned in a range detectable by the sensor of the moving object. For example, when the moving object is a vehicle traveling on a road, objects such as other vehicles, pedestrians, traffic lights, lanes, and crosswalks around the moving object may be detected by the sensor of the moving object. The information on the object may include relative position information of the object with respect to the moving object. The relative position information of the object with respect to the moving object may include a relative position value of the object with respect to a position of the moving object and/or a relative velocity of the object with respect to a velocity of the moving object.

According to an example, the target may correspond to an object with the confidence level of the recognition accuracy being less than a threshold value among at least one object detected by the sensor of the moving object. In some examples, the confidence level of the recognition accuracy may be determined based on performance of the sensor and a range from the object. For example, a confidence level greater than or equal to the threshold value may be ensured for the recognition accuracy of an object within a 50 m radius of the lidar sensor, but the confidence level of the recognition accuracy of an object beyond the 50 m radius of the lidar sensor may be less than the threshold value.

According to an example, the target may correspond to an object positioned at a threshold range or farther from the moving object among the at least one object detected by the sensor of the moving object. For example, an object beyond the 50 m radius of the lidar sensor may be identified as a target.

In operation 120, second sensing information may be obtained, including information on the target from the interworking moving object. In some examples, the interworking moving object is another moving object interworking with the moving object, and may include, for example, a moving object capable of communicating with the moving object. For example, the moving object and the interworking moving object may directly transmit and receive data or transmit and receive data via a server. For example, the interworking moving object may be configured to communicate with the moving object and may include a moving object positioned within the threshold range from the moving object.

The second sensing information may include information obtained from a sensor of the interworking moving object and/or information obtained by processing the information obtained from the sensor of the interworking moving object. For example, the sensor of the interworking moving object may include at least one of a position sensor (e.g., a GPS sensor), a velocity sensor, an IMU, a camera (e.g., IR, mono, dual color, RGBW, active, and passive cameras), a lidar sensor, a radar sensor, or a fusion sensor.

According to some examples, the second sensing information may include a position information of the interworking moving object. The position information of the interworking moving object may include one or more of a position value of the interworking moving object, a value of a change in position of the interworking moving object, or a velocity of the interworking moving object. For example, the position information of the interworking moving object may include absolute velocity information and International GNSS Service (IGS) information of the interworking moving object. For example, the absolute velocity information of the interworking moving object may include absolute velocity information measured by a velocity measuring sensor of the interworking moving object. For example, the absolute velocity information of the interworking moving object may include absolute velocity information determined by an velocity estimation algorithm.

The second sensing information according to an example may include information on an object detected by the sensor of the interworking moving object. The object detected by the sensor of the interworking moving object may include at least one object located in a range detectable by the sensor of the interworking moving object. For example, when the interworking moving object is a vehicle traveling on a road, objects such as other vehicles, pedestrians, traffic lights, lanes, and crosswalks around the interworking moving object may be detected by the sensor of the interworking moving object. The information on the object may be information on characteristics of the object that may be derived from the information collected by the sensor, and may include, for example, recognition information of the object and/or position information of the object. The position information of the object may include at least one of a position value of the object, a value of a change in position of the object, or a velocity of the object. In some examples, the recognition information of the object may include a classification information for the object indicating the class that the object belongs to. In some examples, the classification information may indicate a type that an object belongs. In some examples, the classification information may be based on or segmenting an image of the object, and determining which object each pixel of the image belongs to.

In some examples, the second sensing information may include information on the target identified in operation 110. For example, the second sensing information may include recognition information of a target identified with the interworking moving object. For example, the second sensing information may include relative position information of a target with respect to the interworking moving object. As described above, the relative position information of the target with respect to the interworking moving object may include a relative position value of the target with respect to a position of the interworking moving object and/or a relative velocity of the target with respect to a velocity of the interworking moving object.

In some examples, the information on the target included in the first sensing information may be different from the information on the target included in the second sensing information. For example, since the positions and velocities of the moving object and the interworking moving object are different from each other, relative position information of the target with respect to the moving object may be different from relative position information of the target with respect to the interworking moving object.

In some examples, a confidence level of the recognition accuracy of the target according to the first sensing information may be less than the threshold value. In some examples, a confidence level of the recognition accuracy of the target according to the second sensing information may be greater than or equal to the threshold value. The recognition accuracy of a target may refer to reliability of the information on a target obtained from a sensor. In some examples, when the confidence level for the recognition accuracy of an object within the 50 m radius of the lidar sensor is greater than or equal to the threshold value, a distance between the moving object and the target may exceed 50 m, so that the confidence level of the recognition accuracy of the target according to the first sensing information may be less than the threshold value. In some examples, when the distance between the interworking moving object and the target is within 50 m, the confidence level of the recognition accuracy of the target according to the second sensing information may be less than the threshold value.

According to an example, the first sensing information may include information on a target detected by a first sensor of the moving object. The first sensor may include at least one sensor included in the moving object. The second sensing information may include information on a target detected by the second sensor of the interworking moving object. The second sensor may include at least one sensor included in the interworking moving object. For example, the first sensor may include a radar sensor. For example, the second sensor may include a lidar sensor. In some examples, a confidence level of recognition accuracy of a target according to the first sensing information obtained from the radar sensor of the moving object may be less than the threshold value. In some examples, a confidence level of recognition accuracy of a target according to the second sensing information obtained from the lidar sensor of the interworking moving object may be greater than or equal to the threshold value.

Figure 2:
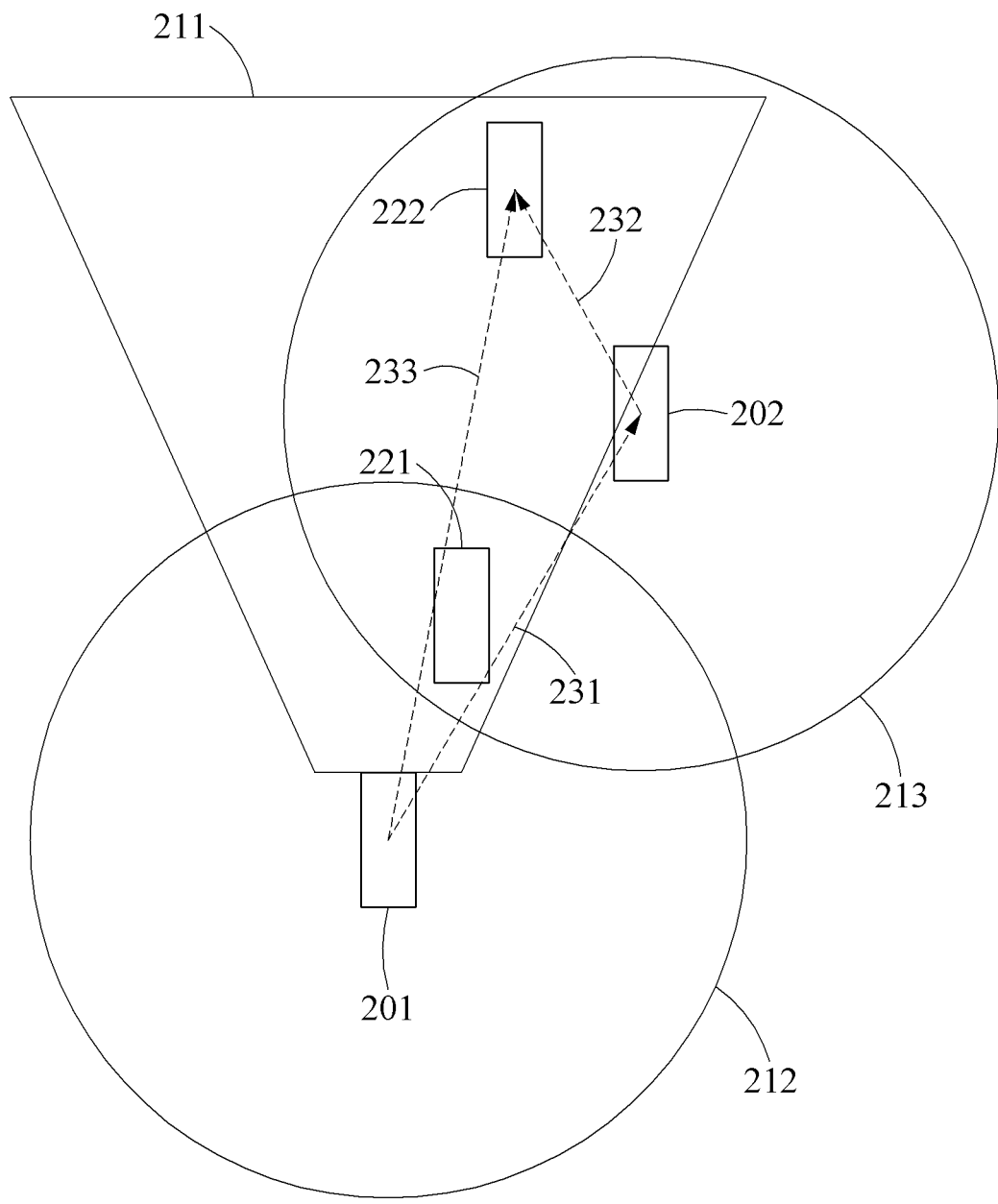
FIG. 2 illustrates an example of a moving object, an interworking moving object, and objects positioned on a road.

For example, referring to FIG. 2, the radar sensor installed on a front side of the moving object 201 may detect objects 221 and 222 positioned in a front range 211 of the moving object 201. The lidar sensor of the moving object 201 may detect the object 221 positioned in a range 212, which is within a radius with the recognition accuracy at the confidence level greater than or equal to the threshold value. A confidence level of the recognition accuracy for the object 221 obtained by the lidar sensor and radar sensor of the moving object 201 may be greater than or equal to the threshold value. A confidence level of the recognition accuracy for the object 222 obtained by the lidar sensor and radar sensor of the moving object 201 may be less than the threshold value. In some examples, the object 222 with the confidence level of the recognition accuracy less than the threshold value may be identified as a target. The lidar sensor of the interworking moving object 202 may detect the objects 221 and 222 positioned in a range 213, which is within a radius with the recognition accuracy at the confidence level greater than or equal to the threshold value. Thus, a confidence level of the recognition accuracy for the object 222 identified as a target obtained by the lidar sensor of the interworking moving object 202 may be greater than or equal to the threshold value.

In operation 130, a time of the first sensing information and a time of the second sensing information may be of synchronized. For example, operation 130 may include synchronizing the time of the first sensing information and the time of the second sensing information based on time information included in the first sensing information and time information included in the second sensing information.

In some examples, the first sensing information may include data obtained from the sensor in a cycle. For example, when a resolution of the sensor is 10 hertz (hz), the sensor may collect data every 1/10 seconds. The resolution of the sensor of the moving object corresponding to the first sensing information may be different from the resolution of the sensor of the interworking moving object corresponding to the second sensing information. Also, when the moving object includes a plurality of sensors and the first sensing information is collected from the plurality of sensors, each of the plurality of sensors corresponding to the first sensing information may have different resolutions.

In some examples, data included in the first sensing information and data included in the second sensing information may be temporally synchronized based on time information at which the data is collected from the sensor. In some examples, the data included in the first sensing information and the data included in the second sensing information, whose collected times are closest, are aligned together for the temporal synchronization of the data included in the first sensing information and the data included in the second sensing information. Since the moving object and the interworking moving object have positions changing with time, the first sensing information and the second sensing information synchronized temporally may be used to obtain the information on the target. In other words, information on the target collected from the moving object and information on the target collected from the interworking moving object at the same time or within time with an error range may be aligned through the temporal synchronization.

In some examples, the sensing information may include IGS clock information. The IGS clock information may be used as timestamp information of data included in the sensing information. In some examples, the time information included in the sensing information may be corrected according to a method of clock bias correction.

In operation 140, a neural network for estimating information on a target from the first sensing information may be trained. In some examples, the neural network may include a plurality of layers. The plurality of layers may include an input layer, at least one hidden layer, and an output layer. In the neural network layer, an input image or map may be convoluted with a filter called a kernel, and as a result, a plurality of feature maps may be output. The output feature maps may be again convoluted in a subsequent convolutional layer as input feature maps with another kernel, and a plurality of new feature maps may be output. After the convolution operations are repeatedly performed, and potentially, other layer operations performed, the recognition or classification results of features of the input image through the neural network may be output.

The neural network or deep neural network (DNN) may generate mapping between input information and output information, and may have a generalization capability to infer a relatively correct output with respect to input information that has not been used for training. The neural network may refer to a general model that has an ability to solve a problem or perform tasks, as non-limiting examples, where nodes form the network through connections and other parameters are adjusted through training.

The DNN may include at least one of a fully connected network (FCN), a convolutional neural network (CNN), and a recurrent neural network (RN N), a restricted Boltzmann machine (RBM), a deep belief network (DBN), a bidirectional recurrent DNN (BRDNN), a deep Q-network, or a combination of two or more thereof, but examples thereof are not limited to the foregoing examples. For example, at least a portion of the layers in the neural network may correspond to the CNN, and another portion of the layers may correspond to the FCN. In this case, the CNN may be referred to as a convolutional layer, and the FCN may be referred to as a fully connected layer.

In an example, training an artificial neural network may indicate determining and adjusting weights and biases between layers or weights and biases among a plurality of nodes belonging to different layers adjacent to one another, as only non-limiting examples of such parameters.

After being trained based on deep learning, the neural network may perform inference that is suitable for a training purpose by mapping input data and output data that are in a nonlinear relationship to each other. The deep learning is a machine learning technique for solving a problem such as image or speech recognition from a big data set. The deep learning may be construed as an optimized problem solving process of finding a point at which energy is minimized while training the neural network using prepared training data. In some examples, overfitting may occur when too much training data is used to train an example neural network.

Through supervised or unsupervised learning of the deep learning, a structure of the neural network or a weight corresponding to the model may be obtained, and the input data and the output data may be mapped to each other through the weight. When a width and a depth of the neural network are sufficiently large, the neural network may have a capacity sufficient to implement an arbitrary function. The neural network may achieve an optimized performance when learning a sufficiently large amount of training data through an appropriate training process.

The neural network will be expressed as being trained in advance or pre-trained. The expression "trained in advance" or "pre-trained" may indicate a time before the neural network "starts." That the neural network "starts" means that the neural network is ready for inference. For example, that the neural network that "starts" may include that the neural network is loaded into a memory, or that input data for the inference is input to the neural network after the neural network is loaded into the memory.

In some examples, operation 140 may include training the neural network for estimating the information on the target from the first sensing information by using the information on the target included in the second sensing information as ground truth data. In some examples, inputting the first sensing information may be input to the neural network to obtain an output. The neural network may be trained to minimize a difference between the output and the second sensing information. In some examples, the neural network may be trained so that the estimation performance of the neural network satisfies a threshold. In some examples, the neural network may be trained so that the difference between the output and the second sensing information is lesser than a threshold.

Figure 6:
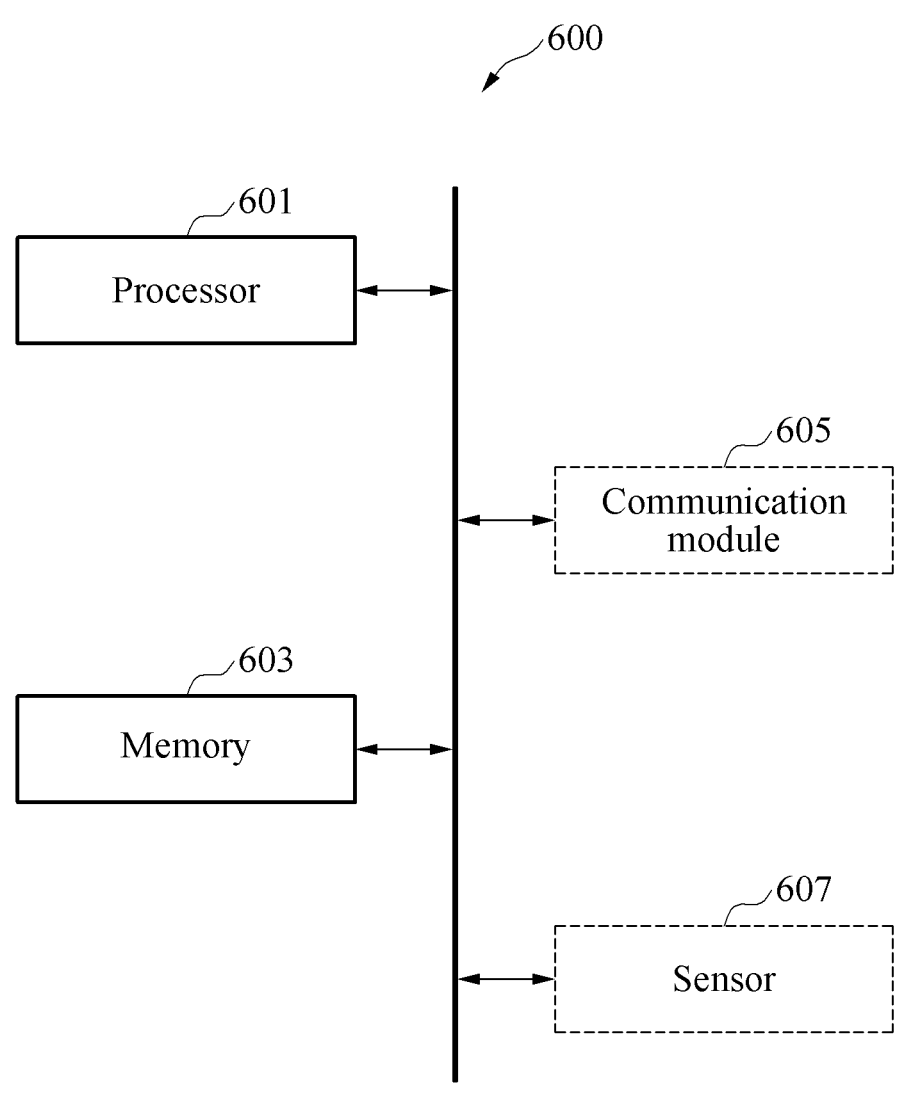
FIG. 6 illustrates an example of a configuration of a device.

The neural network may include a hardware structure that may be implemented through execution of instructions by a processor, such as processor 601 illustrated in FIG. 6. A device that implements a machine learning model, e.g., a neural network, typically requires a large amount of computational power to be able to handle complex input data, and as a learning capacity of the neural network increases, the connections within the neural network typically become more complex. Also, as machine learning models become more complex, and an amount of memory allocated to the neural network increases.

According to an example, the information on the target may be extracted from the second sensing information based on a relative positional relationship between the moving object and the interworking moving object. A method of extracting the information on the target from the second sensing information will be described further with reference to FIG. 3 below.

According to an example, the neural network may include a neural network trained to receive an input of the information on the target included in the first sensing information and to output the information on the target. For example, the neural network may include a neural network trained to receive an input of the information on the target included in the first sensing information and to output recognition information of the target.

According to an example, ground truth data for training of the neural network may be generated from the second sensing information. The neural network may receive an input of the information on the target included in the first sensing information and may be trained by using the recognition information of the target included in the second sensing information as the ground truth data corresponding to the input. For example, the neural network may include a neural network trained to receive an input of information on the target obtained from the radar sensor of the moving object included in the first sensing information and to output classification information of the target. Training data used for training the neural network may include the information on the target obtained from the radar sensor of the moving object included in the first sensing information and the classification information of the target included in the second sensing information. The neural network may be trained to receive an input of the information on the target obtained from the radar sensor of the moving object and to output the classification information of the target included in the second sensing information, which is the ground truth data of the input.

The information processing method according to an example may include obtaining the information on the target by applying the first sensing information to the neural network when estimation performance of the neural network satisfies a threshold. The neural network may be trained until the estimation performance of the neural network satisfies the threshold. When the estimation performance of the neural network satisfies the threshold, the neural network may be used to estimate the recognition information of the target. For example, a device storing the neural network may be mounted on a moving object, and the moving object equipped with the device storing the neural network may obtain recognition information of the target from the neural network by applying the first sensing information to the neural network.

The information processing method according to an example may include correcting the information on the target included in the first sensing information based on the information on the target included in the second sensing information. A method of correcting the information on the target included in the first sensing information will be further described with reference to FIG. 5 below.

Figure 3:
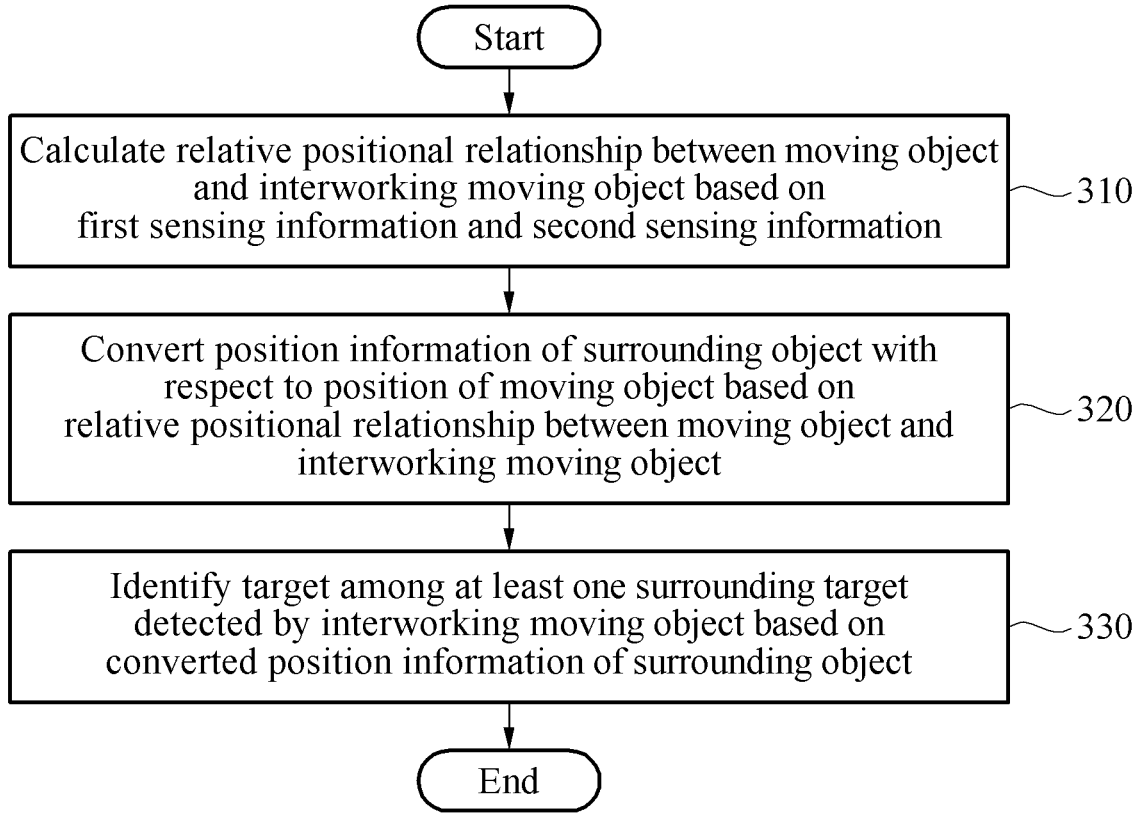
FIG. 3 illustrates an example of a method of extracting information of a target from second sensing information.

FIG. 3 illustrates an example of a method of extracting information on a target from second sensing information.

The operations of FIG. 3 may be performed in the sequence and manner as shown. However, the order of some operations may be changed, or some of the operations may be omitted, without departing from the spirit and scope of the shown example. Additionally, operations illustrated in FIG. 3 may be performed in parallel or simultaneously. One or more blocks of FIG. 3, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., device 600 in FIG. 6). In addition to the description of FIG. 3 below, the descriptions of FIGS. 1-2 are also applicable to FIG. 3 and are incorporated herein by reference. Thus, the above description may not be repeated here for brevity purposes.

Referring to FIG. 3, in operation 310 a relative positional relationship between the moving object and the interworking moving object may be calculated based on the first sensing information and the second sensing information. The relative positional relationship between the moving object and the interworking moving object may be obtained based on the position information of the moving object included in the first sensing information and the position information of the interworking moving object included in the second sensing information. For example, when the first sensing information includes a coordinate value of the moving object corresponding to a specific coordinate system and the second sensing information includes a coordinate value of the interworking moving object corresponding to the same coordinate system, the relative positional relationship between the moving object and the interworking moving object may be obtained with a difference between the coordinate value of the moving object and the coordinate value of the interworking moving object.

In some examples, the information processing method may include extracting the information on the target from the second sensing information based on the relative positional relationship between the moving object and the interworking moving object. The second sensing information may include position information of at least one surrounding object detected by the interworking moving object. The information on the surrounding object identified as the same object as the target may be extracted from information on surrounding object(s) included in the second sensing information based on the relative positional relationship between the moving object and the interworking moving object.

In operation 320, the position information of the surrounding object with respect to the position of the moving object may be converted based on the relative positional relationship between the moving object and the interworking moving object. In operation 330, the target among the at least one surrounding target detected by the interworking moving object based on the converted position information of the surrounding object may be identified. The relative position information of the target with respect to the interworking moving object of the surrounding object(s) included in the second sensing information may be converted into the relative position information of the target with respect to the position of the moving object based on the relative positional relationship between the moving object and the interworking moving object.

For example, referring to FIG. 2, a vector converted into relative position information of the object 222 with respect to a position of the moving object 201 may be obtained by adding a vector 232 indicating a relative position of the object 222 with respect to the interworking moving object 202 to a vector 231 indicating a relative position of the interworking moving object 202 with respect to the moving object 201. When the converted vector is the same as a vector 233 indicating a relative position of the target with respect to the interworking moving object 202 or is within a difference of a threshold range, the object 222 may be identified as the target.

Figure 4:
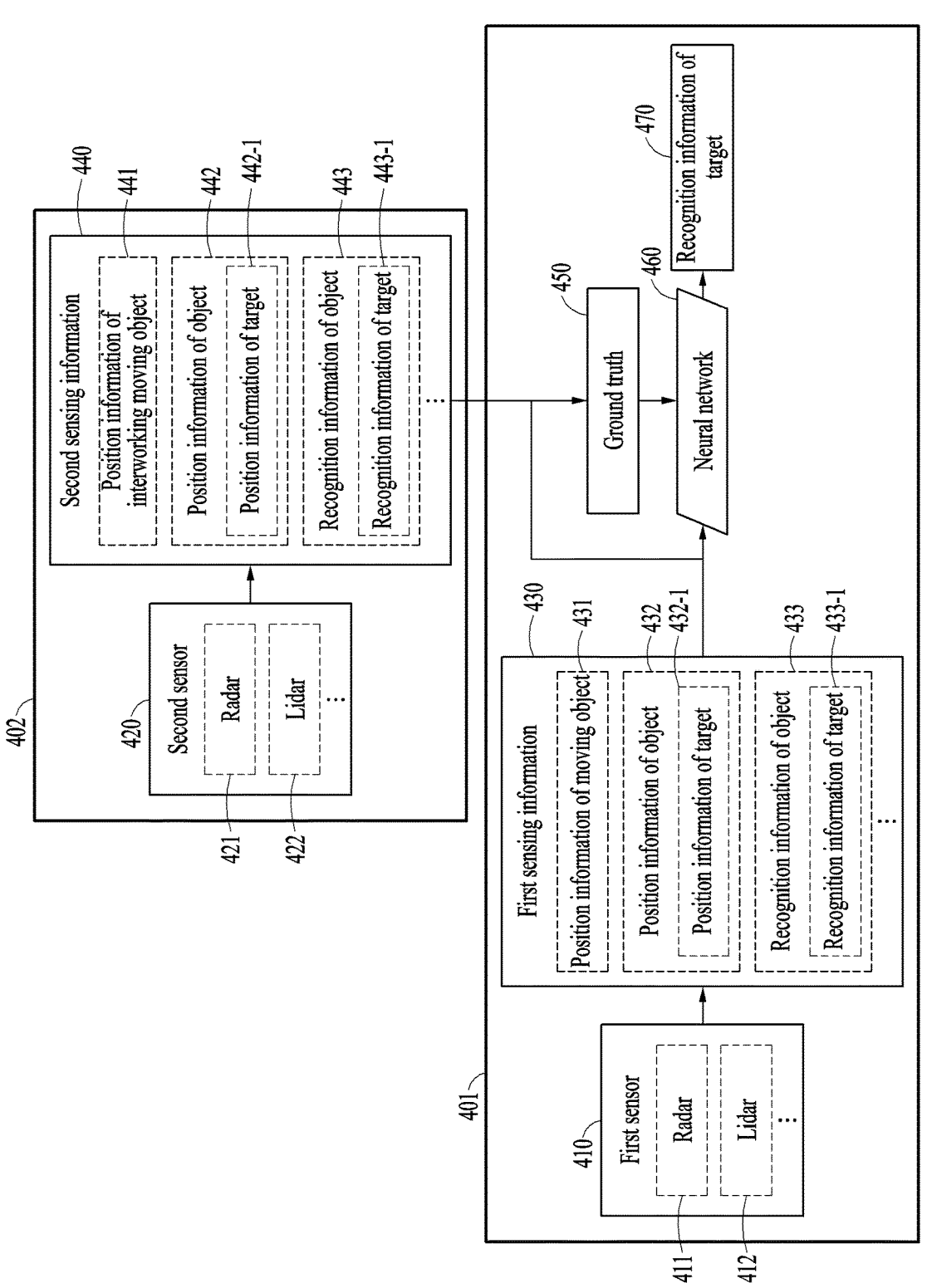
FIG. 4 illustrates an example of a framework for obtaining recognition information on a target from a moving object.

FIG. 4 illustrates an example of obtaining recognition information on a target from a moving object.

Referring to FIG. 4, a moving object 401 according to an example may include a first sensor 410. The first sensor 410 may include a radar sensor 411 and a lidar sensor 412.

First sensing information 430 may include position information 431 of the moving object 401 detected by a position sensor and/or velocity sensor included in the first sensor 410 of the moving object 401. For example, the position information 431 of the moving object 401 may include at least one of absolute velocity information of the moving object 401 and IGS information obtained by a method of estimating Ego-velocity.

The first sensing information 430 may include information on an object detected by the first sensor 410 of the moving object 401. The information on the object detected by the first sensor 410 of the moving object 401 may include position information 432 of the object obtained by the radar sensor 411. The position information 432 of the object obtained by the radar sensor 411 may include, for example, at least one of a distance between the radar sensor 411 and the object, an angle between the radar sensor 411 and the object, or a velocity of the object. The information on the object detected by the first sensor 410 of the moving object 401 may include recognition information 433 of the object obtained from the lidar sensor 412. The recognition information 433 of the object may include at least one of classification information indicating which type an object belongs to or segmentation information indicating which object each pixel of an image belongs to.

In some examples, at least one of the objects detected by the first sensor 410 of the moving object 401 may be identified as a target. Among the objects detected by the first sensor 410 of the moving object 401, in some examples, an object with a confidence level of recognition accuracy of the recognition information 433 of the object included in the first sensing information 430 less than the threshold value may be identified as the target. In some examples, among the objects detected by the first sensor 410 of the moving object 401, an object positioned at a threshold range or farther from the moving object 401 may be identified as the target. For example, a confidence level of the recognition accuracy of the recognition information 433 of the object positioned at the threshold range or farther from the lidar sensor 412 of the moving object 401 may be less than the threshold value and may be identified as the target.

An interworking moving object 402 may include a second sensor 420. The second sensor 420 may include a radar sensor 421 and a lidar sensor 422.

Second sensing information 440 may include position information 441 of the interworking moving object 402 detected by a position sensor and/or velocity sensor included in the second sensor 420 of the interworking moving object 402. For example, the position information 441 of the interworking moving object 402 may include at least one of absolute velocity information of the interworking moving object 402 and IGS information obtained by a method of estimating an Ego-velocity.

The second sensing information 440 may include information on an object detected by the second sensor 420 of the interworking moving object 402. The information on the object detected by the second sensor 420 of the interworking moving object 402 may include position information 442 of the object obtained by the radar sensor 421. The position information 442 of the object obtained by the radar sensor 421 may include, for example, at least one of a distance between the radar sensor 421 and the object, an angle between the radar sensor 421 and the object, or a velocity of the object. The information on the object detected by the second sensor 420 of the interworking moving object 402 may include recognition information 443 of the object obtained from the lidar sensor 422. The recognition information 443 of the object may include at least one of classification information indicating which type an object belongs to or segmentation information indicating which object each pixel of an image belongs to.

The second sensing information 440 may include information on a target detected by the second sensor 420 of the interworking moving object 402. The information on the target detected by the second sensor 420 may include position information 442-1 of the target and recognition information 443-1 of the target. At least one of the object(s) detected by the second sensor 420 may be identified as a target. For example, according to the method described above with reference to FIG. 3, at least one object among the object(s) detected by the second sensor 420 may be identified as the target based on the position information 431 of the moving object 401 included in the first sensing information 430 and the position information 441 of the interworking moving object 402 included in the second sensing information 440.

A confidence level of recognition accuracy of the recognition information 443-1 of the target included in the second sensing information 440 may be greater than or equal to a threshold value. The recognition information 443-1 of the target included in the second sensing information 440 may be used as ground truth data 450 for training a neural network 460 for estimating recognition information 470 of the target from the first sensing information 430. The trained neural network 460 may output the recognition information 470 of the target from information 432-1 and/or 433-1 on the target included in the first sensing information 430. The recognition information 470 of the target may supplement the recognition information 433-1 of the target with low recognition accuracy included in the first sensing information 430 may be obtained through the trained neural network 460.

As described above, a device storing the trained neural network 460 may be mounted on a moving object. The moving object equipped with the device storing the trained neural network 460 may obtain recognition information of a surrounding object by applying sensing information on the surrounding object obtained from a lidar sensor to the trained neural network 460.

Figure 5:
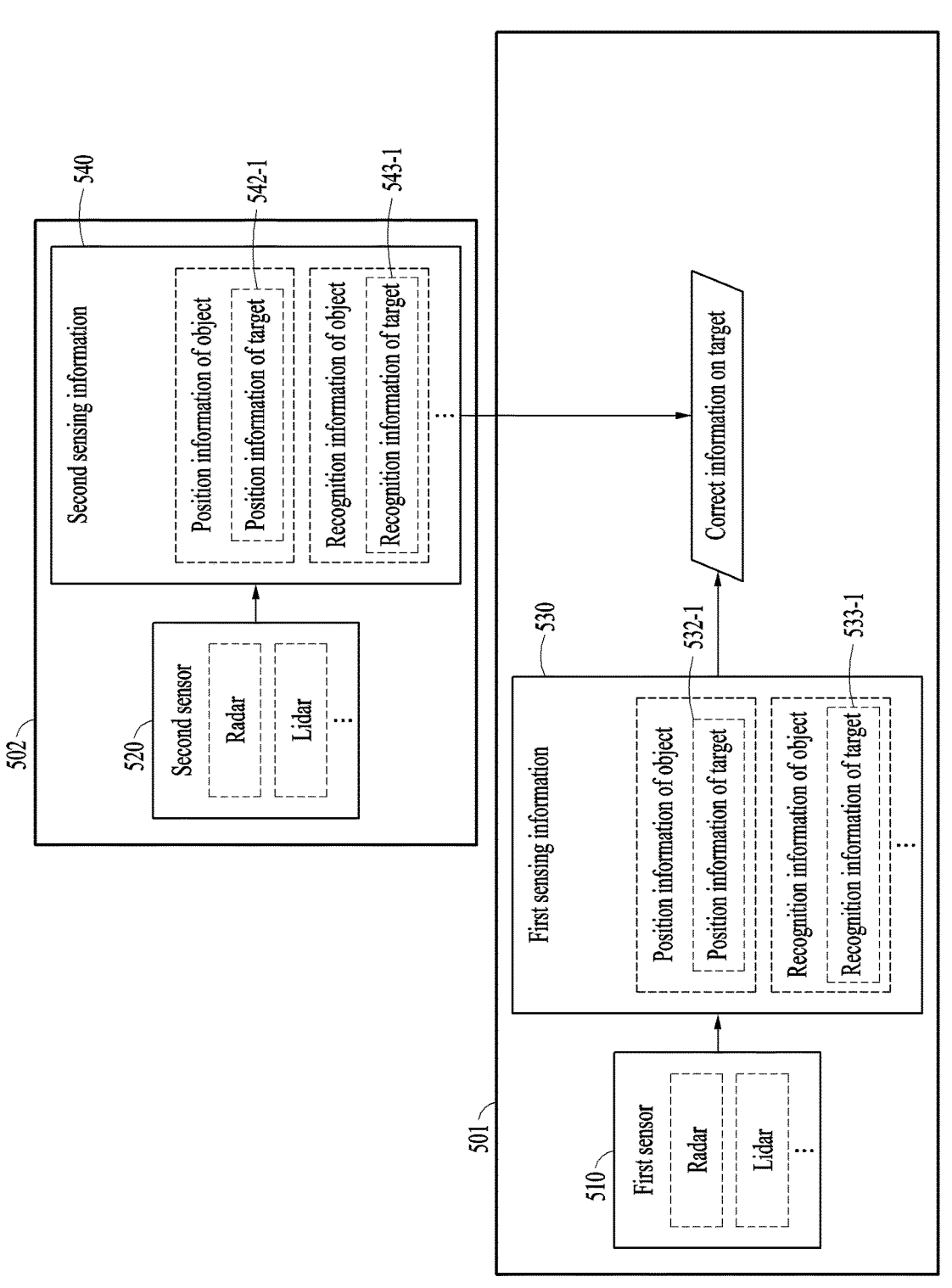
FIG. 5 illustrates an example of a framework for correcting information on a target from a moving object.

FIG. 5 illustrates an example of correcting information on a target from a moving object.

Referring to FIG. 5, the first sensing information 530 may be obtained from the first sensor 510 of the moving object 501. The second sensing information 520 may be obtained from the second sensor 520 of the interworking moving object 502.

The information 532-1 and/or 533-1 on the target included in the first sensing information 530 may be corrected based on the information 542-1 and/or 543-1 on the target included in the second sensing information 540. For example, the position information 532-1 of the target included in the first sensing information 530 may be corrected based on the position information 542-1 of the target included in the second sensing information 540. For example, the recognition information 533-1 of the target included in the first sensing information 530 may be corrected based on the recognition information 543-1 of the target included in the second sensing information 540.

The information 532-1 and/or 533-1 on the target included in the first sensing information 530 with a low confidence level of the recognition accuracy may be corrected based on the information 542-1 and/or 543-1 on the target included in the second sensing information 540 with a relatively higher confidence level of the recognition accuracy. The low recognition accuracy of the information 532-1 and/or 533-1 on the target included in the first sensing information 530 may be improved by the correction.

FIG. 6 illustrates an example of a configuration of a device.

Referring to FIG. 6, a device 600 may include a processor 601 and a memory 603. The device 600 may include a device for performing the image processing method described above with reference to FIGS. 1 to 5. For example, the device 600 may include a moving object or an electronic device included (or mounted or installed) in the moving object.

The processor 601 may perform at least one of the operations described above with reference to FIGS. 1 to 5. For example, the processor 601 may perform at least one of operations of the information processing method including operation 110 of identifying the target with the confidence level of the recognition accuracy less than the threshold value or the target positioned at the threshold range or farther based on the first sensing information collected from the sensor, operation 120 of obtaining the second sensing information including the information on the target from the interworking moving object, operation 130 of synchronizing time of first sensing information and time of second sensing information, and operation 140 of training the neural network for estimating the information on the target from the first sensing information described above with reference to FIG. 1.

The processor 601 may read/write neural network data, for example, image data, feature map data, kernel data, biases, weights, for example, connection weight data, hyperparameters, and other parameters etc., from/to the memory 603 and implement the neural network using the read/written data. When the neural network is implemented, the processor 601 may repeatedly perform operations between an input and parameters, in order to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 601 performs convolution operations with an operation count of up to hundreds of millions to tens of billions, and the frequency at which the processor 601 accesses the memory 603 for the convolution operations rapidly increases.

The processor 601 may be a processing device implemented by hardware including a circuit having a physical structure to perform operations. For example, the operations may be implemented by execution of computer-readable instructions that configure the processing device to perform any one, or any combination, of the operations described.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 601 is provided below.

The memory 603 may include a volatile memory and/or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 603 is provided below.

The memory 603 may store data related to the information processing method described with reference to FIGS. 1 to 5. For example, the memory 603 may store data generated during a process of performing the information processing method, or data necessary for performing the information processing method. For example, the memory 603 may store the first sensing information and the second sensing information. For example, the memory 603 may store a weight of a neural network trained to recognize a target from the first sensing information.

The memory 603 may store a program implementing the information processing method described with reference to FIGS. 1 to 5. The processor 601 may execute a program stored in the memory 603 and may control the device 600. Codes of the program executed by the processor 601 may be stored in the memory 603.

The device 600 may include a communication module 605. The communication module 605 may provide a function for the device 600 to communicate with other electronic devices or other servers through a network. In other words, the device 600 may be connected to an external device through the communication module 605 and exchange data. For example, the device 600 may exchange data (e.g., the second sensing information) with an interworking moving object through the communication module 605. For example, the device 600 may be connected to other electronic devices, servers, or networks through the communication module 605 and exchange data.

The device 600 may include a sensor 607. The sensor 607 may include a sensor for collecting information on an environment around the device 600. For example, the sensor 607 may include at least one of a position sensor (e.g., a GPS sensor), a velocity sensor, an IMU, a camera (e.g., IR, mono, dual color, RGBW, active, and passive cameras), a lidar, sensor, a radar sensor, or a fusion sensor.

For example, when the device 600 is a moving object, the device 600 may include the processor 601, the memory 603, the communication module 605 which exchanges data with the interworking moving object, and at least one sensor 607 which collects the information on the surrounding objects.

For example, when the device 600 is an electronic device included in a moving object, the device 600 may include the processor 601 and the memory 603. The communication module 605 which exchanges data with the interworking moving object and the at least one sensor 607 which collects the information on the surrounding objects may be included in the moving object separately from the device 600.

The device 600 may further include components not shown in drawings. For example, the device 600 may further include an input and output interface including an input device and an output device as means for an interface with the communication module 605. In addition, for example, the device 600 may further include other components such as a transceiver, various sensors, and database.

The computing apparatuses, the electronic devices, the processors, the memories, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising: in response to a performed identification, based on first sensing information collected from a moving object, of a target having a confidence level of recognition accuracy less than a threshold: obtaining second sensing information on the target from an interworking moving object; synchronizing the first sensing information and the second sensing information based on time information included in the first sensing information and time information included in the second sensing information; and training a neural network to perform an estimating of recognition information of the target from the first synchronized sensing information by using information on the target included in the second synchronized sensing information as ground truth data for the estimated recognition information.

2. The method of claim 1, further comprising:
calculating a relative positional relationship between the moving object and the interworking moving object based on the first sensing information and the second sensing information; and
extracting the information on the target from the second sensing information based on the relative positional relationship between the moving object and the interworking moving object.

3. The method of claim 2, wherein
the second sensing information comprises position information of at least one surrounding object detected by the interworking moving object; and
the extracting of the information on the target from the second sensing information comprises:
converting position information of the at least one surrounding object with respect to a position of the moving object based on the relative positional relationship between the moving object and the interworking moving object, and
identifying the target from the at least one surrounding object based on the converted position information of the surrounding object.

4. The method of claim 1, further comprising:
obtaining the information on the target by applying the first sensing information to the neural network, in response to estimation performance of the neural network satisfying a threshold.

5. The method of claim 1, further comprising:
correcting corresponding information on the target included in the first sensing information based on the information on the target included in the second sensing information.

6. The method of claim 1, wherein
the first sensing information comprises corresponding information on the target detected by a first sensor of the moving object, and
the second sensing information comprises the information on the target, as detected by a second sensor of the interworking moving object.

7. The method claim of 6, wherein
the first sensor comprises a radar sensor, and
the second sensor comprises a lidar sensor.

8. The method of claim 1, wherein the first sensing information comprises position information of the moving object and relative position information of the target with respect to the moving object.

9. The method of claim 1, wherein the second sensing information comprises position information of the interworking moving object, relative position information of the target based on the interworking moving object, and recognition information of the target.

10. The method of claim 1, wherein the information on the target comprises any one or more of classification information, segmentation information, or position information of the target.

11. A non-transitory computer-readable storage medium storing instructions that, when executed by at least one processor, cause the at least one processor to perform the method of claim 1.

12. A moving object comprising: at least one processor; and a memory comprising one or more non-transitory storage media that store instructions that, when executed by the at least one processor, configures the at least one processor to: in response to a performed identification, based on first sensing information collected from a moving object, of a target having a confidence level of recognition accuracy less than a threshold: obtain second sensing information on the target from an interworking moving object; synchronize the first sensing information and the second sensing information based on time information included in the first sensing information and time information included in the second sensing information; and train a neural network to perform an estimating of recognition information of the target from the first synchronized sensing information by using information on the target included in the second synchronized sensing information as ground truth data for the estimated recognition information.

13. The moving object of claim 12, further comprising:
at least one sensor configured to collect information on an object around the moving object.

14. The moving object of claim 12, wherein the execution of the instructions by the at least one processor further configures the at least one processor to:
calculate a relative positional relationship between the moving object and the interworking moving object based on the first sensing information and the second sensing information; and
extract the information on the target from the second sensing information based on the relative positional relationship between the moving object and the interworking moving object.

15. The moving object of claim 14, wherein the second sensing information comprises position information of at least one surrounding object detected by the interworking moving object, and the execution of the instructions by the at least one processor further configures the at least one processor to:

convert position information of the at least one surrounding object with respect to a position of the moving object based on the relative positional relationship between the moving object and the interworking moving object; and identify the target from the at least one surrounding object based on the converted position information of the surrounding object.

16. The moving object of claim 12, wherein the execution of the instructions by the at least one processor further configures the at least one processor to:

obtain the information on the target by applying the first sensing information to the neural network, in response to estimation performance of the neural network satisfying a threshold.

17. The moving object of claim 12, wherein the execution of the instructions by the at least one processor further configures the at least one processor to:

correct corresponding information on the target included in the first sensing information based on the information on the target included in the second sensing information.

18. The moving object of claim 12, wherein the first sensing information comprises corresponding information on the target detected by a first sensor of the moving object, and the second sensing information comprises the information on the target, as detected by a second sensor of the interworking moving object.

19. The moving object of claim 18, wherein the first sensor comprises a radar sensor, and the second sensor comprises a lidar sensor.

\* \* \* \* \*